Inventor:
Charles A. E. Beurtheret,
by Merton D Moore
His Attorney

Patented Jan. 10, 1950

2,494,327

UNITED STATES PATENT OFFICE 2,494,327

TELEMETRY SYSTEM

Charles A. E. Beurtheret, Asnieres, France, assignor to General Electric Company, a corporation of New York Application March 5, 1948, Serial No. 13,099
In France November 17, 1943

Section 1, Public Law 690, August 8, 1946
Patent expires November 17, 1963

3 Claims. (Cl. 318—28)

1

My invention relates to a reciprocal actuating system involving remote control by electrical translating means and, more particularly, to a system for positioning movable conjugate elements.

It is an object of my invention to provide an improved system including similar elements that can be actuated to corresponding positions by remote control.

A further object of my invention is to bring about a condition such that any displacement imposed on one of the elements will entail a corresponding displacement of the other element.

In conformity with the invention, each one of the parameters that are characteristic the position of a movable element, at the location of the controlling member as well as the location of a member to be controlled, is utilized to control the position of a variable electrical element. Generally, this electrical element must be capable of varying the frequency of an associated oscillation generator. The frequency which characterizes the value of each one of the parameters of the controlling member is then transmitted to the remote station including the member to be controlled, either directly or after transposition into another frequency band. Inasmuch as the station of the member to be controlled is identical to that at the controlling station, the functions of either station are interchangeable. There are two frequencies available for each one of the movable members. One frequency characterizes the position of the local member and the other frequency characterizes the position of the remote corresponding member when the latter has not yet occupied the same position as the former. At coincidence, both frequencies are equal. These frequencies are introduced in a comparator which detects any difference and then acts accordingly on the control of a servomotor or the like to move the local movable member until the characteristic frequencies are equal, or until they differ by a predetermined amount.

For additional objects and advantages, and for a better understanding of the invention, attention is now directed to the following description and accompanying drawings, and also to the appended claims in which the features of the invention believed to be novel are particularly pointed out.

2

Figure 2:
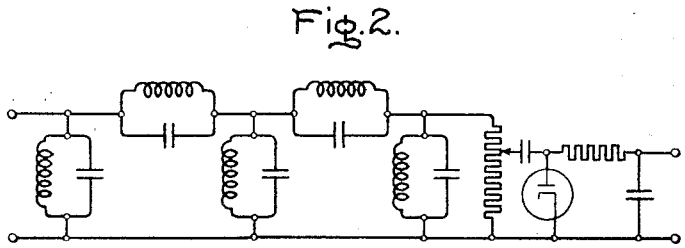
Fig. 2 is a schematic diagram of a filter circuit which may be used to increase the selectivity of filter 14 in the system of Fig. 1.
Figure 3:
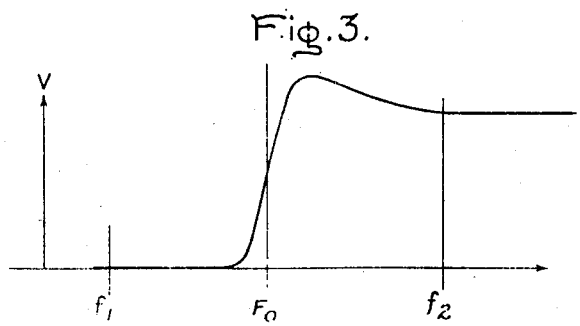

Fig. 3 is a graphical representation of the voltage-frequency characteristics of the filter circuit of Fig. 2.

Figure 1:
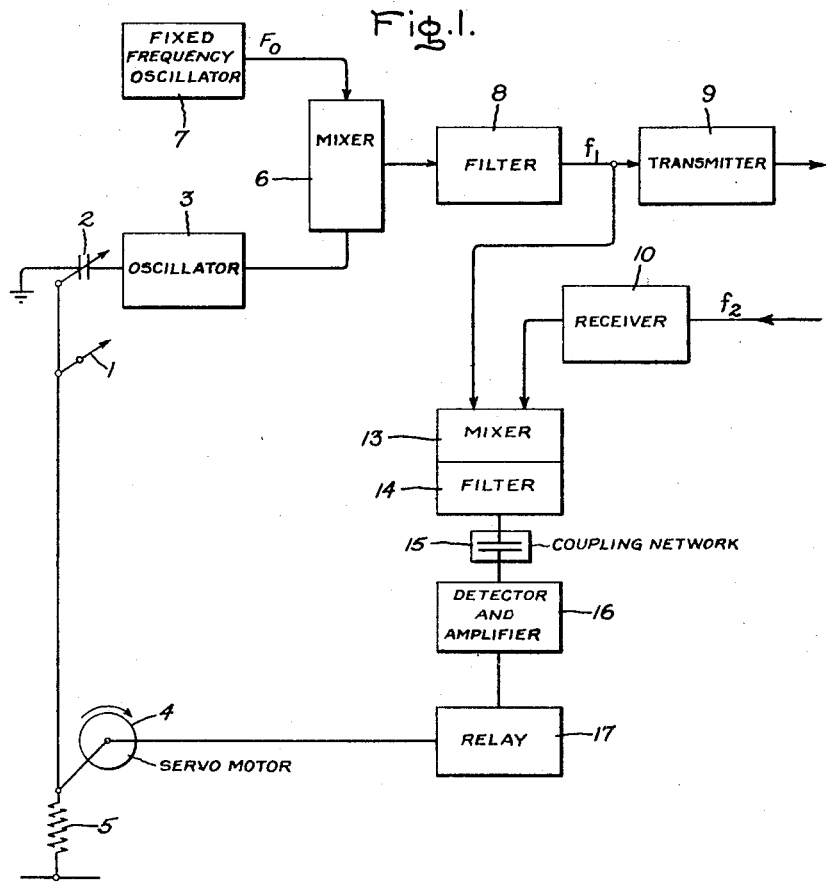
Fig. 1 represents a schematic diagram of apparatus at one station embodying my invention.

Referring now to Fig. 1, I have shown a variable switch 1 which may be a commutator, capacitor or any other variable element. This movable element 1 coacts for each one of its parameters with an electrical element 2 that is capable of setting up a variation in the frequency of an oscillator 3. For purposes of illustration, I have shown the electrical element 2 as a capacitor which causes a variation in the frequency of oscillator 3. The movable element 1 is likewise connected for each one of its parameters to a device 4 which can control it, illustrated as a servomotor. A restoring force is also interposed, represented by way of illustration as a spring 5.

The variable frequency of the oscillator 3 is applied to a mixer 6 which also receives oscillations from a fixed frequency oscillator 7. After passing through a filter 8, the resultant beat frequency $f_1$ is supplied to a suitable transmitter 9, and serves to modulate the transmitter 9.

The servomotor 4 is controlled in the following manner. A receiver 10 receives a frequency $f_2$ which is transmitted by a remote station identical to that of Fig. 1. This frequency $f_2$ is brought together with the frequency $f_1$ into a frequency comparator or mixer 13. The resultant beat frequency is supplied through a filter 14, an appropriate coupling network 15 (which, for illustration, I have shown as a capacitor), detector and amplifier 16 and is finally impressed on a relay 17 which actuates the servomotor 4.

The preceding description is representative of a case of only one parameter. When there are several parameters, there are as many installations similar to that as just described as there are parameters except for the fixed oscillator 7, the mixer 6, the filter 8, transmitter 9 and receiver 10, which are common. In the case of "$n$" parameters, the installations give rise to "$n$" frequency bands which then modulate the transmitter 9. The remote station is identical to the local station and each, depending upon the requirements, may act as a controlling station or controlled station.

It is assumed that at the beginning the two movable members occupy identical positions at the local and remote stations. For a given parameter, both transmitters emit the same frequency and the servomotors are not actuated by the relays. As long as this condition remains, nothing happens. Now if the movable element of one station assumes a different position and causes one of its parameters to vary, it will bring about the emission of a frequency $f_2$ at the output end of its filter 8. The frequency comparator or mixer 13 of the second station will receive the frequency $f_1$ which originates at that same station and also the frequency $f_2$ which originates at the first station. These two frequencies create beats and, after filtering in filter 14, a current will be developed whose frequency is equal to $(f_1-f_2)$ or $(f_2-f_1)$. A voltage corresponding to this frequency is transmitted through high-pass filter network 14 which is characterized by a high attenuation when the frequency decreases below a certain value and which may assume infinite attenuation when the frequency is zero. Starting from a certain frequency value, dependent upon the characteristics of the filter network, the detector 16 receives a voltage which, after suitable amplification, is sufficient to produce the rectified current to operate the relay controlling the servomotor. The servomotor actuates the movable member of the second station until its corresponding parameter is such that this member occupies a position identical to that of the movable member of the first station, and then gives rise to the same frequency $f_2$. The two frequency comparators are then energized by voltages of equal frequency and remain in position until the position of one of the movable elements is again changed.

Fig. 1 represents a station of the remote control position system which may be either a control station or a controlled station since they are identical. For purposes of illustration, to explain the operation of the system, let us assume that there are only two such stations. The moving elements 1, are coupled to variable condensers 2 which control the oscillating frequency of the oscillators 3. For each position of the moving elements 1 there is only one value of frequency. The frequency output of the variable frequency oscillator 3 is transposed in the audio frequency band by heterodyning in the mixer 6 with a fixed frequency $F_0$ generated in the oscillator 7. The output of mixer 6 comprises two voltages of frequency $(f+F_0)$ and $(f-F_0)$. Filter 8 passes only one of the two frequencies to the transmitter 9, for instance the signal $f_1=(f-F_0)$. This signal is transmitted to the other station of the system. It is assumed that the moving element in the other station is in a different position and hence has an output frequency $f_2$ that is different from $f_1$. The receiver 10 detects the signal $f_2$ coming from the other station. The signals $f_2$ and $f_1$ are supplied to the mixer 13 which produces output signals $f_1-f_2$ and $f_1+f_2$. The signal $f_1+f_2$ is filtered out by filter 14. The remaining signal is coupled to a detector stage by the coupling stage 15. The transfer impedance of network 15 is determined in such a manner so as to produce an amplitude attenuation which varies linearly with $1/F$. The attenuation of stage 15 is to be practically infinite when the frequency of the input signal is small, so that no signal is passed to detector and amplifier 16 when $f_1=f_2$. Sufficient amplification is provided to actuate servomotor 4 through its energizing relay 17. Servomotor 4 drives the moving element 1 until its position corresponds with that of the moving element of the control station or, in other words, until $f_1=f_2$. As illustrated, servomotor 4 is a one-way servomotor, as the receiving channel as described is sensitive to the difference only and not direction. Hence, it is necessary to provide the motor 4 with a restoring torque or force as represented schematically by the spring 5.

What has been said for one parameter is repeated for all of the parameters involved by the change in position of the movable control member until the control member occupies the same position as the controlling member. As the device, just described in connection with the frequency comparators, does not disclose the direction of the frequency deviation this makes it necessary to add to the device a restoring force of permanent direction which is shown schematically as spring 5. This force is balanced by a partial operation in one direction of the detector that energizes the servomotor at reduced power continuously.

Each one of the two frequencies, $f_1$ and $f_2$, may be applied to a frequency-comparing device, called a discriminator, and which transforms an electrical oscillation into a continuous voltage proportional to the frequency. The two voltages obtained are applied in opposition to an electrode or an electron relay which will control the servomotor in the desired direction. Such a discriminator must be capable of discerning whether two frequencies (both of which are variable within a definite band) are equal, and, if not, to reveal the sense of the difference, so as to act on a servomotor.

By using a discriminator, it is possible to bring about the beat only after the transposition of one or the other of the frequencies by a fixed quantity $F_0$. If one of the frequencies to be compared is subjected, through modulation, to a transposition amounting to $F_0$, the beat with the other frequency, when balance prevails, will be a frequency equal to $F_0$. By the insertion of a discriminator circuit such as that illustrated by Fig. 2 which has the property of furnishing a continuous voltage, the amplitude of which varies more or less linearly as a function of the frequency which has been applied to it the restoring spring 5 may be omitted. The circuit of Fig. 2 comprises a filter section having a steep boundary around $F_0$, as illustrated by the curve of Fig. 3, and followed by a rectifier. This circuit would be inserted in Fig. 1 as a part of the filter 14.

It can readily be seen that the system disclosed in Fig. 1 may be either the controlling or controlled station inasmuch as they are identical. If the moving element 1 of the control station is controlled by any exterior force such as a manual control, the corresponding element is driven towards the same relative position. As long as the frequencies of the two stations are different, the motor 4 of the control station will try to bring the pilot element 1 into the same position as the controlled element.

While certain specific embodiments have been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. In a remote control system, a plurality of stations, each station comprising a transmitter, a receiver, a master oscillator, means for comparing transmitted frequency with received frequency, means for varying the frequency of one of said oscillators and means responsive to the difference in frequencies to vary other of said oscillators in a like manner until said difference in frequencies is reduced to zero.

2. In a reciprocal actuating system, a plurality of stations, each station comprising a transmitter, a master oscillator for controlling the frequency of said transmitter, a receiver, an operating member having a plurality of operating positions and mechanically connected to said oscillator to vary the frequency of said oscillator for each of said positions, means for comparing the transmitted frequency with the frequencies received from other of said stations and a servomotor responsive to the difference in frequencies of said stations for operating other of said members to positions corresponding to first said operating member.

3. In a remote control system, a plurality of stations, each station comprising a transmitter, a master oscillator, a movable operating member mechanically connected to said oscillator, a receiver, means for comparing transmitted frequencies with received frequencies, manual means for actuating one of said operating members to one of a plurality of operating positions, said last means varying the frequency of said oscillator connected to said member, means responsive to the difference in said frequencies to actuate other of said operating members to corresponding positions and to vary the frequency of the oscillators connected to last said operating members until said difference in frequencies is reduced to zero.

CHARLES A. E. BEURTHERET.

REFERENCES CITED

The following references are of record in the file of this patent:

UNITED STATES PATENTS

| Number | Name | Date |
| --- | --- | --- |
| 2,280,019 | Alexandersson et al. | Apr. 14, 1942 |
| 2,429,771 | Roberts | Oct. 28, 1947 |